Sept. 11, 1951 R. V. POUND 2,567,825

WAVE GUIDE MIXER

Filed Oct. 10, 1945

INVENTOR.
ROBERT V. POUND
BY
William D Hall
ATTORNEY

Patented Sept. 11, 1951 2,567,825

UNITED STATES PATENT OFFICE 2,567,825

WAVE GUIDE MIXER

Robert V. Pound, Cambridge, Mass., assignor, by mesne assignments, to the United States of America as represented by the Secretary of War Application October 10, 1945, Serial No. 621,568

13 Claims. (Cl. 250—20)

This invention relates to electrical apparatus and more particularly to wave guide circuits for coupling local oscillator energy into mixing circuits.

This application is a continuation in part of my copending application, entitled Wave Guide Mixer, Serial No. 608,292, filed August 1, 1945, which has matured into Patent No. 2,518,937, issued August 15, 1950.

In accordance with present practice, radio object-locating systems employ automatic frequency control (AFC) circuits to maintain the proper relationship between the frequency of the received signal and the local oscillator signal to produce therefrom a beat or difference frequency which is the intermediate frequency to which the system receiver is tuned.

In such systems using AFC circuits, it is highly desirable to employ two mixing circuits fed by the local oscillator. One of these mixing circuits, the AFC mixer, receives a signal preferably directly from the system transmitter, and the second mixing circuit, the received signal mixer, receives signals that are picked up by the antenna of the radio object-locating system. The primary reason for employing two mixers is to prevent the frequency of the local oscillator signal from being affected or controlled by signals from nearby systems or other undesired external sources. As is well understood in the art, however, coupling of undesired signals from the signal mixer to the AFC mixer may still occur through the local oscillator coupling circuits.

It is an object of the present invention, therefore, to provide an improved apparatus for coupling the local oscillator to two mixers which prevents coupling from one mixer to the second mixer through the local oscillator coupling circuits.

It is a further object of the present invention to provide an improved apparatus for coupling a local oscillator to two mixers wherein the local oscillator may be optimumly loaded.

For a better understanding of the invention, together with other and further objects thereof, reference is had to the following description taken in connection with the accompanying drawing in which.

Figures 1, 2:
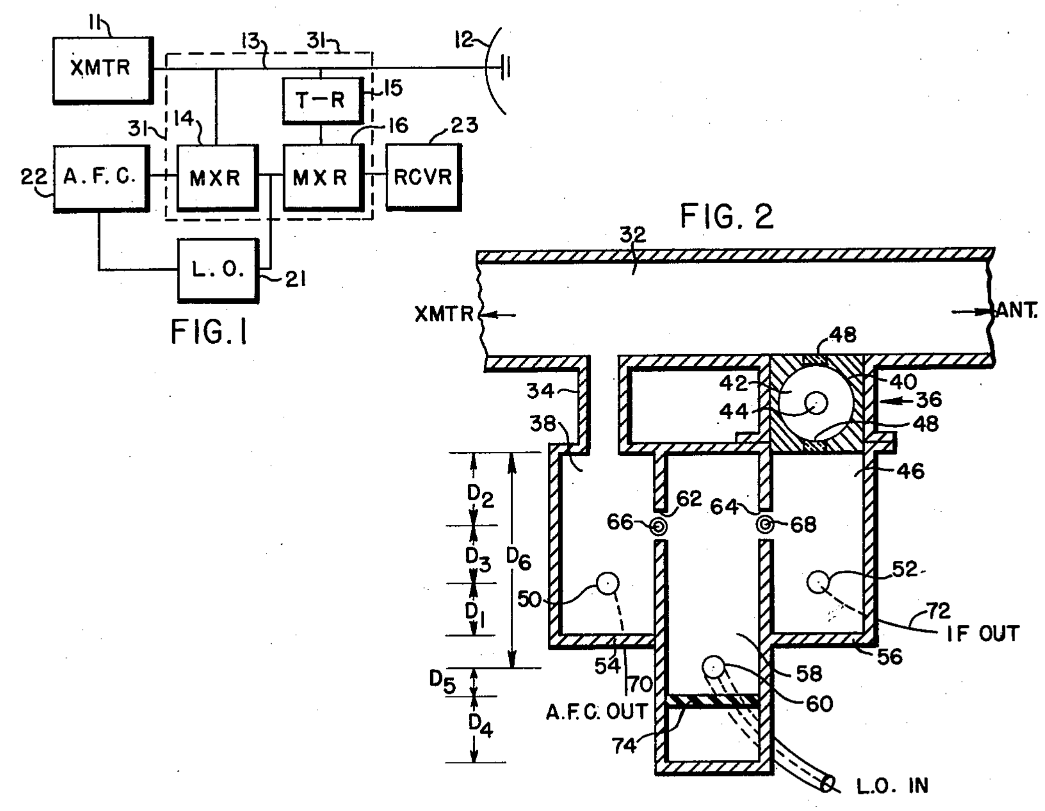
Fig. 1 is a block diagram of a radio object-locating system showing the relationship of the present invention to the system as a whole.
Fig. 2 is a plan view of one embodiment of the invention with the upper wall thereof removed to show its internal structure.

Reference is now had to the drawing and more particularly to Fig. 1 thereof wherein there is illustrated in block diagram form a radio object-locating system comprising a transmitter 11 which feeds an antenna or other radiating device 12 through suitable transmission means 13. Energy is coupled from the transmission line 13 to a mixer circuit 14, preferably by means of a directional coupler (not shown) or other means which insure that the mixer will be operated only by signals from the transmitter 11. Signals from the antenna 12 pass through a transmit-receive (T-R) device 15 to a mixer circuit 16. The T-R device 15 is essentially an amplitude discriminator which prevents transmitted signals, which are of greater amplitude than received signals, from reaching the mixer circuit 16. A local oscillator 21 feeds a signal to both mixers 14 and 16. The output of mixer 14 feeds an automatic frequency control (AFC) circuit 22 which in turn controls the frequency of oscillation of the local oscillator 21. The AFC circuits 22 are well known in the art and will normally include a frequency discriminator and an AFC amplifier and other such circuits as may be necessary to properly control the frequency of the local oscillator. The output of mixer circuit 16 is connected to the remainder of the system receiver 23 which normally includes such components as amplifiers, a detector, and an indicator. A dotted block 31 incloses the portion of the system of Fig. 1 toward which the present invention is directed.

In the operation of the system of Fig. 1 a signal from the transmitter 11 is radiated by antenna 12. A portion of the signal from the transmitter 11 is also fed to the mixer 14, generally through a directional coupler or through means affording high attenuation of the signal, where it is mixed with a signal from oscillator 21. The output of mixer 14 is fed to the AFC circuits 22 wherein the difference frequency of the signals from the local oscillator and from the transmitter is fed to a frequency discriminator. The variation in height of pulses from the frequency discriminator is a function of the deviation of the difference frequency from the desired intermediate frequency. These pulses are converted to a voltage which is applied to a control electrode of the local oscillator in the proper sense to push its frequency in the direction to give the desired intermediate frequency. Signals received by the antenna 12 pass through the T-R device 15 to the mixer 16 wherein they are combined with a signal from the oscillator 21 to produce signals at the intermediate frequency. These intermediate frequency signals are amplified, detected, and indicated in the conventional manner by the remainder of the receiver 23.

Reference is now had to Fig. 2 of the drawing in which there is shown one embodiment of the portion of the system enclosed by the dashed block 31 in Fig. 1. In Fig. 2 there is shown a section of rectangular wave guide 32 which meets the requirements of the transmission means 13 of Fig. 1 and to which there is connected a section of cylindrical tubing 34 and a T-R device represented generally by 36. Both tubing 34 and T-R device 36 are shown connected to the narrow wall of the wave guide 32, but they may, if so desired, be otherwise connected. The tubing 34 is of such a size as to highly attenuate any signal passing between the wave guide 32 and an AFC mixer denoted generally by 38. The tubing 34 may be replaced by a suitable section of rectangular wave guide if desired. The T-R device 36 is shown comprising a solid member 40 in which a cavity or opening 42 has been formed. A probe 44 is so designed that an electric discharge will occur for high amplitude signals and the cavity 42 will be detuned and prevent the passage of these high amplitude signals. Coupling from the wave guide 32 into the cavity 42 and from the cavity 42 to a signal mixer 46 is provided through windows 48, which may be of a suitable substance such as quartz. The operation of T-R devices are well known in the art. The mixers 38 and 46 are essentially sections of wave guide, similar to the wave guide 32, in which are inserted detectors 50 and 52 at a distance $D_1$ from terminations 54 and 56. The detectors 50 and 52 may be silicon crystals or other suitable non-linear elements. The terminations 54 and 56 will normally be short circuits. The distance $D_1$ is approximately one-fourth wavelength as measured within the wave guide and is so adjusted that the two detectors 50 and 52 provide matched load terminations for the respective wave guides in which they are inserted. Interposed between mixers 38 and 46 is a third section of wave guide 58 which is closed at both ends. A coupling probe 60 couples a local oscillator signal to the wave guide 58. A local oscillator tube such as the reflex klystron of the 2K25 type manufactured by Western Electric Co. for operation in the 3.33 centimeter wavelength region may be mounted directly on the wave guide 58 and the coupling probe of the tube allowed to extend into the wave guide 58 Coupling windows 62 and 64 operating in conjunction with tuning screws 66 and 68 couple energy from the wave guide 58 into mixers 38 and 46. The coupling windows 62 and 64 and tuning screws 66 and 68 are shown in greater detail in Fig. 4. The windows 62 and 64 are located at a distance $D_2$ from the AFC and signal inputs to the mixers 38 and 46. The distance $D_2$ is approximately one-fourth wavelength. The detectors 50 and 52 are located a distance $D_3$ from the windows 62 and 64. $D_3$ is approximately one-fourth wavelength. An automatic frequency control output from detector 50 is provided on lead 70 labeled "AFC out" while a signal output from detector 52 is provided on lead 72 labeled "IF out." Located a distance $D_4$ from the end of wave guide 58 on the opposite side of probe 60 from windows 62 and 64 is a resistance strip 74. The distance $D_4$ is approximately one-fourth wavelength and the resistance strip 74 is such that the wave guide 58 is terminated in its characteristic impedance as seen from the probe 60. Other means well known in the art may be utilized to terminate the wave guide 58 in its characteristic impedance. The probe 60 is separated from the resistance strip by a distance $D_5$ which may be any convenient distance. The probe 60 is separated from the end of the wave guide 58 opposite windows 62 and 64 by a distance $D_6$. The distance $D_6$ essentially determines the susceptive component of the admittance seen by the probe 60. The position of the probe 60 along a major axis of a cross-section of wave guide 58 essentially determines the conductive component of the admittance seen by the probe 60. Therefore, it can be seen that, by proper choice of the distance $D_6$ and the transverse position of the probe 60, the probe 60 may be so located as to optimumly load the local oscillator. It has been found that the tube type cited above, the 2K25, operating at approximately 3.33 centimeters, the distance $D_6$ should be approximately one centimeter plus an integral number of quarter wavelengths. It will be obvious to those skilled in the art that the distances $D_1$, $D_2$, $D_3$, and $D_4$ may be altered by adding any number of half wavelengths thereto and, therefore, this invention should not be construed to be limited to the use of quarter wavelength distances.

The relatively high level signal from the transmitter will normally suffer an attenuation of the order of 60 decibels in being propagated through the tube 34. The transmitted signals which are propagated through the tube 34 will still be of sufficient magnitude after being attenuated to operate the mixer 38, but signals which might be received by the antenna will not be sufficiently propagated through tube 34 to affect the mixer operation. A signal from the local oscillator is coupled into the mixer 38 from the wave guide 58 by the window 62. The window 62 together with the tuning screw 66 forms a tuned circuit. However, the screw 66 is so adjusted that the window is greatly detuned from resonance and all signals passing through it will be highly attenuated. The local oscillator signal, which is normally much higher than signals received by the attenna, will pass through the window 62 in sufficient magnitude to operate the mixer 38. The local oscillator signal and the signal from the transmitter are combined in a manner well known in the art to produce an intermediate frequency signal which may be used for AFC.

Received signals pass from the antenna through the T-R device 36 and enter the mixer 46. A signal from the local oscillator is also fed to the mixer 46 through window 64. The window 64 and tuning screw 68 form a tuned circuit which, as before, is detuned from resonance thus affording a high attenuation of signals passing through it. It is desirable to have one window, 62 or 64, detuned on one side of resonance and the other window 64 or 62 detuned on the other side of resonance to minimize load mismatch on the local oscillator. This may be accomplished by turning one screw 66 or 68 in beyond the tuned resonance point or by adding on the opposite side of one window a fixed probe which approximately tunes the window to resonance. Inserting the screw will then detune this window in the direction opposite to that in which the window without the probe is detuned. It has been pointed out that the tube 34 presents a sufficiently high attenuation path to prevent any action of the AFC circuit due to received signals which might pass through it. It will also be noted that any signal which would tend to pass from the signal mixer 46 into the local oscillator wave guide 58 and thence into the AFC mixer 38 will be attenuated first by a window 64 and again by window 62. In this manner operation of the AFC circuit is confined to action by signals from the transmitter and action due to nearby systems or other undesirable external sources is minimized or eliminated entirely.

Figure 3:
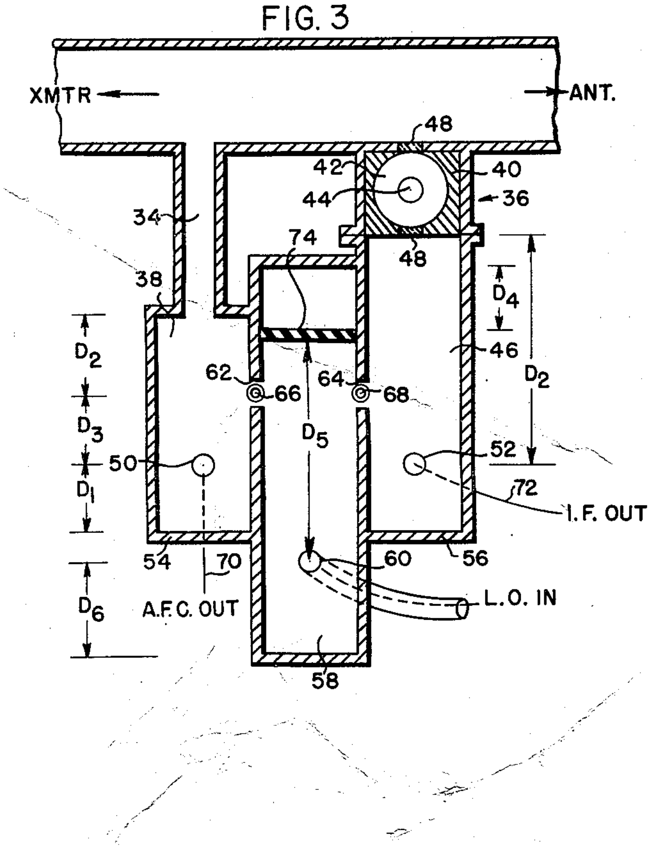
Fig. 3 is a plan view of a second embodiment of the invention with the upper wall thereof removed as in Fig. 2.

Reference is now had to Fig. 3 which illustrates a second embodiment of the invention. The apparatus of Fig. 3 is essentially the same as the apparatus of Fig. 2, and like parts in the two figures are designed with like numbers. The primary difference between the apparatus of Figs. 2 and 3 is that the position of the resistance strip 74 in the wave guide 58 is changed. In the apparatus of Fig. 3 the resistance strip 74 is placed on the opposite side of the windows 62 and 64 from the probe 60. The same general considerations regarding critical distances is manifest in this embodiment. The operation of the apparatus of Fig. 3 is also analogous to the operation of the apparatus of Fig. 2.

Figure 4:
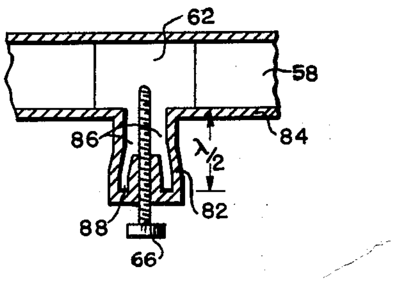
Fig. 4 is a cross-sectional view of one of the tuned coupling windows of Figs. 2 and 3.

Referring now to Fig. 4, there is shown in greater detail the window 62 in the narrow wall 78 of a section of the rectangular wave guide 58, and the tuning screw 66 which are similar in construction to window 64 and screw 68 in Figs. 2 and 3. A screw holder 82 is fitted or otherwise mechanically or electrically connected to a broad wall 84 of the rectangular wave guide. The screw 66 does not touch the wall 84, but an electrical short circuit is afforded at this point due to the effect of the half wavelength choke 86 which is shorted at its far end 88. The operation of this device as a tuned circuit is well known in the art.

While there has been described what is at present considered the preferred embodiments of the invention, it will be obvious to those skilled in the art that various changes and modifications may be made therein without departing from the invention.

The invention claimed is:

1. A multiple function mixer system for mixing two radio frequency signals with a common local oscillator frequency signal comprising a first wave guide having a first mixing device mounted therein, means for applying a first radio frequency signal to said first wave guide, a second wave guide having a second mixing device mounted therein, means for applying a second radio frequency signal to said second wave guide, a third wave guide having means for applying a local oscillator frequency signal thereto, a pair of means loosely coupling said third wave guide to said first and second wave guides respectively, short-circuiting means terminating one end of said third wave guide, and impedance means coupled to the other end of said third wave guide and designed to terminate it in its characteristic impedance whereby said local oscillator frequency signal applying means is substantially impedance matched to said third wave guide over a band of frequencies regardless of the load of said first and second wave guides thereon.

2. A mixer system according to claim 1 in which each of said means coupling said third wave guide to said first and second wave guides are tunable apertures, whereby the amounts of local oscillator frequency energy coupled to said mixers are adjustable.

3. A mixer system according to claim 2 in which said coupling apertures are tuned to frequencies respectively above and below the frequency of said local oscillator signal.

4. A multiple function mixer system according to claim 1 in which said means for applying a local oscillator signal is disposed within said third wave guide at a point between said impedance means and said short-circuiting means.

5. A mixer system according to claim 4 in which said pair of coupling means are disposed between said local oscillator frequency signal applying means and said short-circuiting means.

6. A mixer system according to claim 5 in which said other end of said third wave guide is short-circuited at a distance substantially a quarter of a wavelength at said local oscillator frequency from said impedance means.

7. A multiple function mixer system according to claim 4 in which said pair of coupling means are disposed between said local oscillator frequency signal applying means and said impedance means.

8. A mixer system according to claim 7 in which said other end of said third wave guide is short-circuited at a distance substantially a quarter of a wavelength at said local oscillator frequency from said impedance means.

9. A radio frequency mixer system comprising a first wave guide having a mixing device mounted therein and means for applying a radio frequency signal thereto, a second wave guide having a means for applying a local oscillator frequency signal thereto, means loosely coupling said second wave guide to said first wave guide for applying a portion of said local oscillator signal to said mixing device substantially without absorbing any of said radio frequency signal, short-circuiting means terminatng one end of said second wave guide, and impedance means coupled to the other end of said second wave guide and designed to terminate it in its characteristic impedance whereby said local oscillator frequency signal applying means is substantially impedance matched to said second wave guide over a band of frequencies regardless of the load of said first wave guide thereon.

10. A radio frequency mixer system according to claim 9 in which said means loosely coupling is disposed between said means for applying a local oscillator frequency signal and said short-circuiting means.

11. A radio frequency mixer system according to claim 9 in which said means loosely coupling is disposed between said means for applying a local oscillator frequency signal and said impedance means.

12. A mixer system according to claim 9, in which said other end of said second wave guide is short-circuited at a distance substantially a quarter of a wavelength at said local oscillator frequency from said impedance means.

13. A mixer system according to claim 1, in which said other end of said third wave guide is short-circuited at a distance substantially a quarter of a wavelength at said local oscillator frequency from said impedance means.

ROBERT V. POUND.

REFERENCES CITED

The following references are of record in the file of this patent:

UNITED STATES PATENTS

| Number | Name | Date |
|---|---|---|
| 2,379,395 | Ziegler et al. | June 26, 1945 |
| 2,408,826 | Vogel | Oct. 8, 1946 |
| 2,433,387 | Mumford | Dec. 30, 1947 |
| 2,436,830 | Sharpless | Mar. 2, 1948 |
| 2,476,885 | McClellan | July 19, 1949 |
| 2,478,317 | Pincell | Aug. 9, 1949 |
| 2,493,066 | Gluyas | Jan. 3, 1950 |
| 2,519,734 | Bethe | Aug. 22, 1950 |